(12) United States Patent
McLaren et al.

(10) Patent No.: US 7,451,029 B2
(45) Date of Patent: Nov. 11, 2008

(54) VEHICLE DIRECTION ESTIMATION USING TRANSMISSION CONTROL INFORMATION

(75) Inventors: Ian A. R. McLaren, Chicago, IL (US); Peter J. Dix, Naperville, IL (US); Brian A. Hartman, Clarendon Hills, IL (US)

(73) Assignee: CNH America LLC, New Holland, PA (US)

( * ) Notice: Subject to any disclaimer, the term of this patent is extended or adjusted under 35 U.S.C. 154(b) by 654 days.

(21) Appl. No.: 11/005,263

(22) Filed: Dec. 4, 2004

(65) Prior Publication Data

US 2006/0122754 A1   Jun. 8, 2006

(51) Int. Cl.
G06F 7/70 (2006.01)
(52) U.S. Cl. .............................. 701/50; 701/41; 701/51; 701/200; 172/4.5; 172/9
(58) Field of Classification Search .................... 701/50, 701/51, 41, 200; 172/4.5, 9
See application file for complete search history.

(56) References Cited

U.S. PATENT DOCUMENTS

| | | | |
|---|---|---|---|
| 5,299,130 A | 3/1994 | Ono | |
| 5,438,517 A | 8/1995 | Sennott et al. | |
| 5,928,301 A | 7/1999 | Soga et al. | |
| 5,928,309 A | 7/1999 | Korver et al. | |
| 5,995,895 A | 11/1999 | Watt et al. | |
| 6,151,543 A | 11/2000 | McKee et al. | |
| 6,154,688 A | 11/2000 | Dominke et al. | |
| 6,411,880 B1 | 6/2002 | McKee et al. | |
| 6,662,104 B2 | 12/2003 | Ito et al. | |
| 6,681,551 B1 | 1/2004 | Sheidler et al. | |
| 2003/0107548 A1 | 6/2003 | Eun et al. | |
| 2003/0229437 A1 | 12/2003 | Joe et al. | |
| 2004/0006957 A1 | 1/2004 | Sheidler et al. | |
| 2004/0059471 A1 | 3/2004 | Harvey et al. | |
| 2004/0138027 A1 | 7/2004 | Rustige et al. | |

*Primary Examiner*—Gertrude Arthur Jeanglaude
(74) *Attorney, Agent, or Firm*—Patrick M. Sheldrake; John William Stader; Michael G. Harms

(57) ABSTRACT

A work vehicle has a transmission controller that is configured to determine the direction of travel of the vehicle based upon the state of the transmission. The transmission controller is also configured to communicate this information to navigation system to assist the navigation system in determining the vehicle's movement. The transmission controller determines the direction of travel based upon looking at the clutch state and the vehicle speed.

20 Claims, 4 Drawing Sheets

VEHICLE DIRECTION ESTIMATION USING TRANSMISSION CONTROL INFORMATION

FIELD OF THE INVENTION

The invention relates generally to work vehicles. More particularly, it relates to guidance systems for work vehicles. Even more particularly, it relates to systems and methods for determining velocity and direction of travel of work vehicles.

BACKGROUND OF THE INVENTION

Recently, automatic guidance systems for agricultural and construction vehicles had been devised to steer these vehicles through agricultural fields or work sites along predetermined paths. These guidance systems determine the path and position of the vehicle by combining several different sensor signals and using the signals to determine the position of the vehicle in the field and its distance from the desired track it should be traveling. Clearly, if the vehicle is to follow a predetermined path through the field it must know its current position.

Unfortunately, there is no one universal sensor that is capable of indicating vehicle position with enough accuracy to permit the vehicle to be guided by that signal alone. Consequently, agricultural and construction vehicles using automatic guidance systems combine several different sensor signals which they weigh and balance in a variety of ways.

Each sensor has particular characteristics that make it good to use in certain situations, but bad to use in others. Some sensors are quite good at providing absolute position. Others are quite good at providing relative position. For example, GPS sensors are quite good at providing an absolute position that is accurate to within 20-100 feet of the true position. Unfortunately, GPS sensors have a certain amount of random position "noise" that prevents them from being more accurate than this. To determine position any more accurately than this requires additional sensors.

An alternative and refined GPS system often called "differential GPS" or "DGPS") provides a more accurate measurement of position. It, too, suffers from the same random noise problems that standard GPS systems do. For purposes of this document, the term "GPS" shall refer to both GPS and DGPS systems.

GPS sensors can only provide data indicative of a vehicle's orientation when the vehicle is moving. Once the vehicle is stopped, the GPS sensor has no way of determining what direction the vehicle is pointed. Additional sensor input is required to make this determination.

One such additional sensor that can be combined with the GPS signal is a yaw rate sensor. A "yaw rate" is the rate at which a vehicle turns to the left or the right. By monitoring a yaw rate sensor, a controller can determine the direction the vehicle is pointed, even when it is standing still. Unfortunately, yaw rate sensors tend to drift over time. In other words, even when standing still the sensors indicate some slow turning to the left or right.

Another sensor that is useful in navigating vehicles through fields and can supplement the GPS sensor signal is the electronic compass. These compasses are sensitive to changes in the Earth's magnetic field. Thus, when one turns an electronic compass, it senses the changing magnitude of the magnetic field and responsively determines the direction the compass is pointed. These compasses are much more accurate over time, as compared to yaw rate sensors. They lack the precision of yaw rate sensors, however, and therefore do not provide an accurate measurement of vehicle heading.

Another sensor that is helpful in determining the position of the vehicle and can supplement the GPS sensor signal is a vehicle speed sensor. These sensors indicate the speed at which the vehicle is traveling over the ground. These sensors are highly accurate at measuring distance, but (depending upon their design) provide no indication whatsoever of the direction of travel. Inexpensive speed sensors merely provide a numeric value that indicates the rotational speed of a wheel or shaft on the tractor, and not its direction. In other words, the sensor provides a numeric value that tells the controller how fast the vehicle is moving, but does not tell the controller the direction of movement. The vehicle might be moving forward at the speed indicated by the speed sensor, or it might be moving in reverse.

The advantage of the vehicle speed sensor is its accuracy over short distances. Over distances of 100 or 200 feet, a vehicle speed sensor can provide an extremely accurate measure of distance traveled. Over long distances of a mile or more, a vehicle speed sensor cannot provide an accurate measure of distance traveled. However, a GPS provides reasonably good accuracy at larger distances, so a combination of these two sensors is particularly suitable to determining vehicle position.

A navigation system using a GPS and a vehicle speed sensor also needs to know the direction of travel in order to make sense of the vehicle speed sensor signal. One of the most common direction "sensors" is the FNR lever found in the operator's compartment of many agricultural and construction vehicles. "FNR" stands for "forward-neutral-reverse".

The FNR lever enables the operator to shift from a forward direction of travel to a reverse direction of travel by moving the FNR lever from its F (forward) position to its R (reverse) position. The FNR lever permits the operator to shift from reverse direction of travel to a forward direction of travel by moving the FNR lever from its R position to its F position. The operator can stop the vehicle entirely by moving the FNR lever to its N or "neutral" position. Of course, the FNR lever alone does not move or stop the vehicle. The FNR lever functions as an input device to a transmission controller that engages and disengages the vehicle's transmission in response.

By combining these two signals—the speed signal indicating the absolute speed of the vehicle and the direction of vehicle travel indicated by the FNR lever—and automatic guidance system (in combination with the other sensor signals) can determine accurately the vehicle's position.

While the FNR lever is a good estimation of the direction of travel of the vehicle, it does not always immediately reflect the direction in which the vehicle is traveling. For example, many construction and agricultural vehicles permit the operator to shift the FNR lever from forward to reverse (and vice versa) while the vehicle is moving.

A work vehicle can be traveling forward at a top speed of 10 to 20 miles an hour, for example, and the operator can move the FNR lever to reverse. These vehicles have intelligent transmission controllers that are programmed to rapidly slow the vehicle down until it is stopped, then to start the vehicle moving in reverse, accelerating it until it reaches its predetermined reverse speed.

This process of automatic shifting from forward to reverse while moving forward by slowing the vehicle to a stop, then reversing direction of travel, then accelerating up to speed in reverse is called "shuttle shifting". It is possible to do in a class of transmissions generally called "power shift" or "shuttle shift" transmissions. These vehicles have one or more clutches that can be engaged or disengaged by hydraulic or mechanical actuators under computer control. The computer—typically called a transmission controller—is coupled to the speed sensor and to each of the clutches to selectively engage and disengage them as the controller deems appropriate in accordance with its internal programming.

To perform a typical shuttle shift, a transmission controller is typically programmed to immediately disengage the transmission from its forward gear ratio. The transmission controller does this by automatically disengaging the clutches necessary to drive the vehicle in a forward direction (these clutches are known as the "forward clutches"). The transmission controller is programmed to then slow the vehicle down by automatically engaging the clutches necessary to drive the vehicle in a reverse direction (these clutches are known as the "reverse clutches"). The transmission controller does not fully engaged the reverse clutches, however. Instead, it feathers the reverse clutches, partially engaging them, and permitting them to dissipate the vehicle's energy and to slow the vehicle to a stop. Once the vehicle is stopped—or close to stopped—the transmission controller fully engages the reverse clutches and the work vehicle accelerates in reverse.

This period of shuttle shifting can be significant. For a work vehicle going 18 or 20 miles an hour with a heavy load, it can take four seconds from the time the operator moves the FNR lever from the F position to the R position before the vehicle slows to a complete stop. During this four second period until the work vehicle is stopped, it might travel as far as 200 feet. During this four second period, the FNR lever is essentially providing a false direction of travel to the automatic guidance system, possibly leading the guidance system to steer the vehicle in a wrong direction. To understand how this can occur, it is helpful to understand how navigation controllers that implement the automatic guidance system function.

A typical automatic guidance system is embodied as a program executed by digital computer-based navigation controller. The navigation controller is connected to the various sensors, GPS, yaw rate sensor, speed sensor, electronic compass, FNR lever and whatever other devices or sensors provide it with a signal indicative of position, orientation, and movement. The navigation controller combines the sensor signals by a variety of sensor fusion techniques and determines the vehicle's corresponding position, speed, and direction of travel. Having determined the vehicle's position, the navigation controller then determines how to steer the vehicle onto a desired path of travel.

For an agricultural tractor, for example, the desired path may be along a crop line in a field. For a road grader, the path may follow a contour line of a hill. Whatever the path, the function of the guidance system is to determine the appropriate path, determine the position of the vehicle, calculate the appropriate steering action, and drive the steering actuators to turn the vehicle back onto the desired path.

A navigation controller typically calculates a new control action every 10 ms, or about 100 times a second. What this means is that 100 times a second a typical navigation controller will read its sensors, combine them according to its own internal programming, and determine the appropriate amount to steer the wheels. If the navigation controller makes an error in its calculations, the work vehicle can turn unexpectedly and leave the desired path of travel. The distance from the desired path of travel or "track" is called the "cross-track error". Cross-track error is a fundamental measure of the performance of a n automatic guidance system. Anything that tends to let the vehicle turn away from the track and increase the cross-track error is undesirable. Anything that tends to reduce the cross-track error is beneficial.

False readings from the FNR lever are one source of cross-track error in many automatic guidance systems. Using the shuttle shifting example above, assume an operator, traveling at 18 miles an hour in a forward direction, shifts the FNR lever from forward to reverse.

As explained above, the vehicle does not immediately go into reverse. Instead, it continues forward for perhaps 200 feet (four seconds) slowing the vehicle to a stop before it starts to travel in reverse. During this four second interval, therefore, the navigation controller has received 400 (100 per second times four seconds) false readings of the direction of travel. The FNR lever "told" the navigation controller that the vehicle was traveling in reverse, yet the vehicle continued traveling forward a substantial distance (and time) before truly changing its direction.

Whenever this happens, the navigation controller is unable to process the direction signal given by the FNR lever and properly combine it with the GPS signal. This is understandable, since the successive GPS readings would indicate the vehicle is continuing to travel forward, while the successive FNR lever readings indicate that the vehicle is traveling backwards in the exact opposite direction. Rather than benefiting from the FNR direction signal to more precisely estimate the vehicle's position, speed, orientation, and direction of travel, the navigation controller is led astray, calculating a mistaken and erroneous control signal and possibly driving the wheels to a wrong position, steering the vehicle away from the desired path of travel.

What is needed, therefore, is a work vehicle with an improved system for guidance. What is also needed is an improved method for determining vehicle travel direction for an automatic guidance system that more accurately indicates the direction of travel of the vehicle than an FNR lever. What is also needed is a control system that better determines the vehicle's direction of movement. It is an object of this invention to provide such a work vehicle, method and control system.

These and other aspects of the invention will become apparent upon review of the detailed description, the figures, and the claims provided below.

SUMMARY OF THE INVENTION

In accordance with a first aspect of the invention, a work vehicle is provided, including a chassis; an engine mounted on the chassis; a transmission driven by the engine, the transmission including at least one clutch configured to engage the transmission in a forward gear ratio and at least another clutch configured to engage the transmission in a reverse gear ratio; a plurality of wheels supporting the chassis for movement over the ground, at least one of said wheels being coupled to the transmission to be driven thereby; at least one steering actuator coupled to the chassis to steer the chassis with respect to the ground; a navigation controller coupled to the at least one steering actuator to control the steering actuator; a transmission controller coupled to the transmission and to the navigation controller to sense a transmission parameter and communicate a vehicle direction to the navigation controller based upon the transmission parameter.

The transmission parameter may be a hydraulic fluid pressure of at least one clutch in the transmission. The transmission may include an output shaft, and further wherein the transmission parameter is a speed of the output shaft. The navigation controller may be configured to calculate a steering command based on the vehicle direction received from the transmission controller. The work vehicle may also include a position sensor coupled to the navigation controller and configured to provide the navigation controller with a position of the work vehicle. The transmission controller may be configured to periodically determine whether a forward gear ratio is selected, and to transmit data indicative of vehicle movement in a forward direction based at least upon the forward gear ratio being selected. The navigation controller and the transmission controller may both be microprocessor-based ECUs, and the navigation controller and the transmission controller may be coupled together over a serial communication bus, and the transmission controller may be configured to transmit the vehicle direction to the navigation controller over of the serial communication bus.

In accordance with a second aspect of the invention a method of determining a direction of travel of a work vehicle comprising a transmission, said transmission comprising a plurality of clutches and communicating that direction to a vehicle navigation system is provided, the method including the steps of determining at least one operating state of the transmission; determining a first direction of vehicle travel based upon the at least one operating state; and communicating the first direction of vehicle travel to the vehicle navigation system.

The step of determining at least one operating state may include the step of determining a pressure of a transmission clutch and the step of comparing that pressure to a predetermined clutch pressure. The step of determining at least one operating state may include the step of determining the pressures of a set of clutches sufficient to engage the vehicle in a forward gear ratio and the step of comparing the pressures to a predetermined clutch pressure. The step of determining at least one operating state may include the step of determining the pressures of a set of clutches sufficient to engage the vehicle in a reverse gear ratio and the step of comparing the pressures to a predetermined clutch pressure. The method may further include the steps of determining a second direction of vehicle travel based upon at least a second operating state; and communicating the second direction of vehicle travel to the vehicle navigation system. At least one operating state may be the full engagement of clutches sufficient to drive the vehicle in a forward direction. The at least a second operating state may be the engagement of clutches sufficient to drive the vehicle in a reverse direction.

In accordance with a third aspect of the invention, a control system for work vehicle having a transmission with a plurality of clutches for driving the vehicle over the ground, and a navigation system connected to steering actuators and configured to steer the vehicle is provided, the control system including means for determining a direction of travel of the vehicle; and means for communicating the direction of travel to the navigation system.

The means for determining a direction of travel may include means for determining an engagement state of the plurality of clutches. The means for determining a direction of travel may include means for determining a pressure state of the plurality of clutches. The means for communicating may include a first serial communications means coupling the means for determining a direction of travel and the navigation system. The means for determining a direction of travel may include means for determining whether a plurality of clutches sufficient to engage the vehicle in a forward gear ratio are engaged. The means for determining a direction of travel may include means for determining whether a second plurality of clutches sufficient to engage the vehicle in a reverse gear ratio are engaged.

DETAILED DESCRIPTION OF THE PREFERRED EMBODIMENTS

Figure 1:
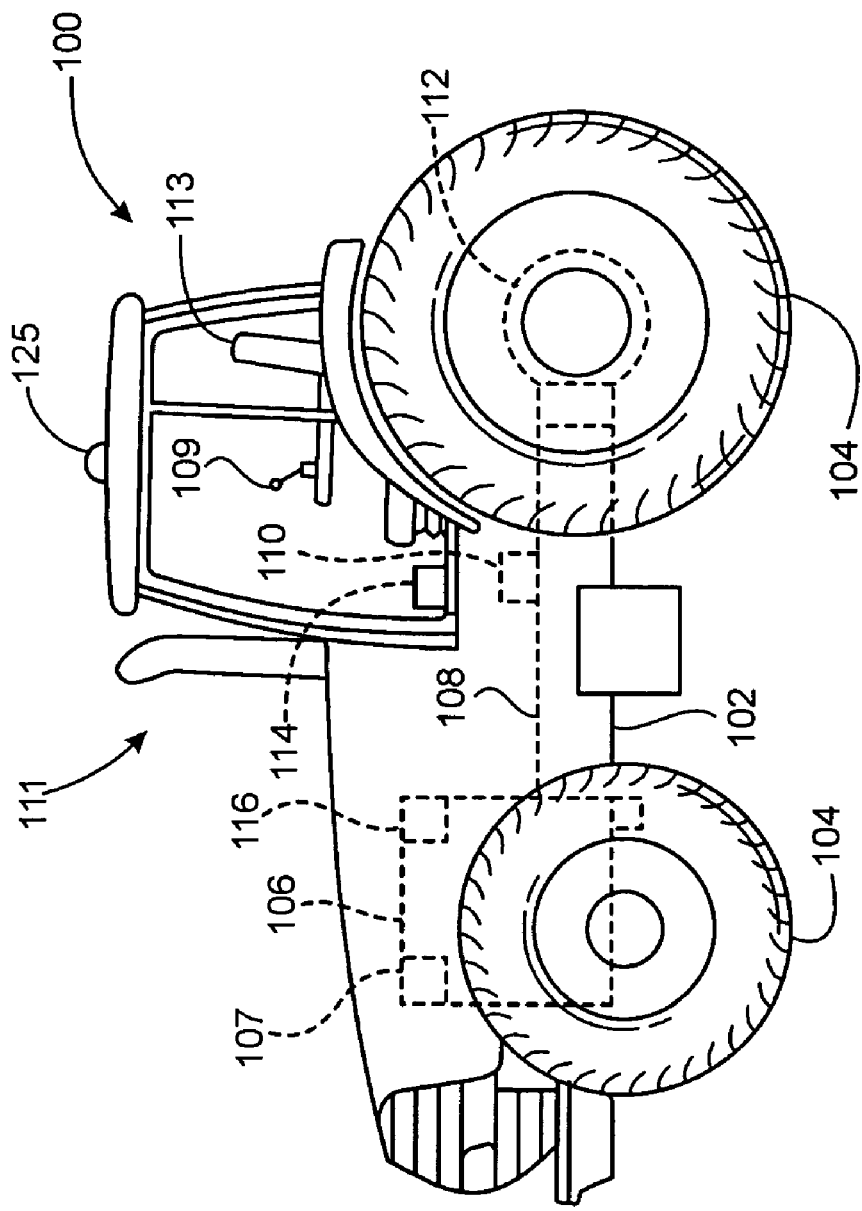
FIG. 1 is a side view of a work vehicle in accordance with the present invention. The work vehicle is an agricultural tractor.

Referring now to FIG. 1, a work vehicle 100, shown here as an agricultural tractor includes a chassis 102, four wheels in that coupled to and supporting chassis 102, an engine 106 mounted on chassis 102 having a speed sensor 107, a transmission 108 mounted on chassis 102 and coupled to engine 106 to be driven thereby, a transmission valve manifold 110 fluidly coupled to transmission 108 to control the flow of hydraulic fluid to and from hydraulic clutches (not shown) disposed inside the transmission 108, and differential 112 coupled to transmission 108 to be driven thereby. Vehicle 100 further includes an FNR lever 109 disposed in operator compartment 111 where it can be easily reached and manipulated by the operator.

Work vehicle 100 is preferably an agricultural tractor. It may be a two wheel drive or four-wheel-drive tractor. The wheels are disposed one on each side of the tractor in mirror relationship about a central longitudinal and vertically extending mirror plane.

Chassis 102 may be a separate component or may be comprised of the structural components of the engine, transmission, and differential. It may be in one unit, or in several units such as a main unit comprising engine, transmission, and differential, forwardly extending front frame, and rearwardly extending rear frame.

There are preferably four wheels 104 that are disposed in a fore-and-aft relationship on either side of the vehicle, extending outwardly therefrom. The front wheels are preferably the same size or smaller than the rear wheels. The wheels themselves are preferably between 2 and 10 feet in diameter.

Engine 106 is preferably an internal combustion engine, and more preferably a diesel engine. Engine 106 preferably has a speed sensor 107 that provides electronic signals indicating the rotational speed the engine.

Transmission 108 is preferably a multispeed transmission having a plurality of selectable gear ratios including a plurality of selectable forward gear ratios and a plurality of selectable rear dear ratios. It may be a power shift transmission or a shuttle shift transmission.

Transmission 108 to includes a plurality of internal clutches that can be selectively engaged to engage transmission 108 in the plurality of gear ratios. One of these clutches may be a master clutch. Each gear ratio of the plurality of gear ratios may require several clutches to be engaged to engage the transmission in any of the plurality of gear ratios.

In the preferred embodiment, a plurality of clutches must be engaged for each of the plurality of gear ratios and each of that plurality of clutches is unique to that gear ratio. Thus, for example, for any selectable gear ratio in which the transmission can be engaged, there is a unique combination of clutches that must be engaged to provide that selectable gear ratio. There are preferably five or more forward gear ratios and three or more reverse gear ratios Each of the clutches in transmission 108 may be manually or automatically engaged. In the preferred embodiment, all the clutches are automatically engaged and disengaged under the control of a control system. In an alternative embodiment, a plurality of clutches are automatically engaged and disengaged under the control of a control system, and at least one clutch is manually engaged and disengaged.

Each of the automatically engageable clutches in transmission 108 preferably includes a hydraulic actuator associated therewith that controls the engagement and disengagement of that clutch.

The clutches in transmission 108 are preferably hydraulically actuated clutches. More preferably they are wet multiplate clutches with integral actuators.

The clutches in transmission 108 are controlled by hydraulic valves disposed in manifold 110. These valves control the flow of hydraulic fluid to and from the clutches of transmission 108. By selectively actuating the hydraulic valves of manifold 110 the operator can engage transmission 108 in any of its selectable forward and reverse gear ratios.

FNR lever 109 has at least three operator-selectable positions: a forward position, called the F position, a neutral position, called the N position, and a reverse position, called the R position. Lever 109 is configured to responsively generate three signals, respectively the up the of: a forward signal indicating an operator's request to select a forward gear ratio and travel forward, a neutral signal indicating an operator's request to place the transmission in neutral, and a reverse signal indicating an operator's request to select a reverse gear ratio and travel backward (i.e. in reverse).

Figure 2:
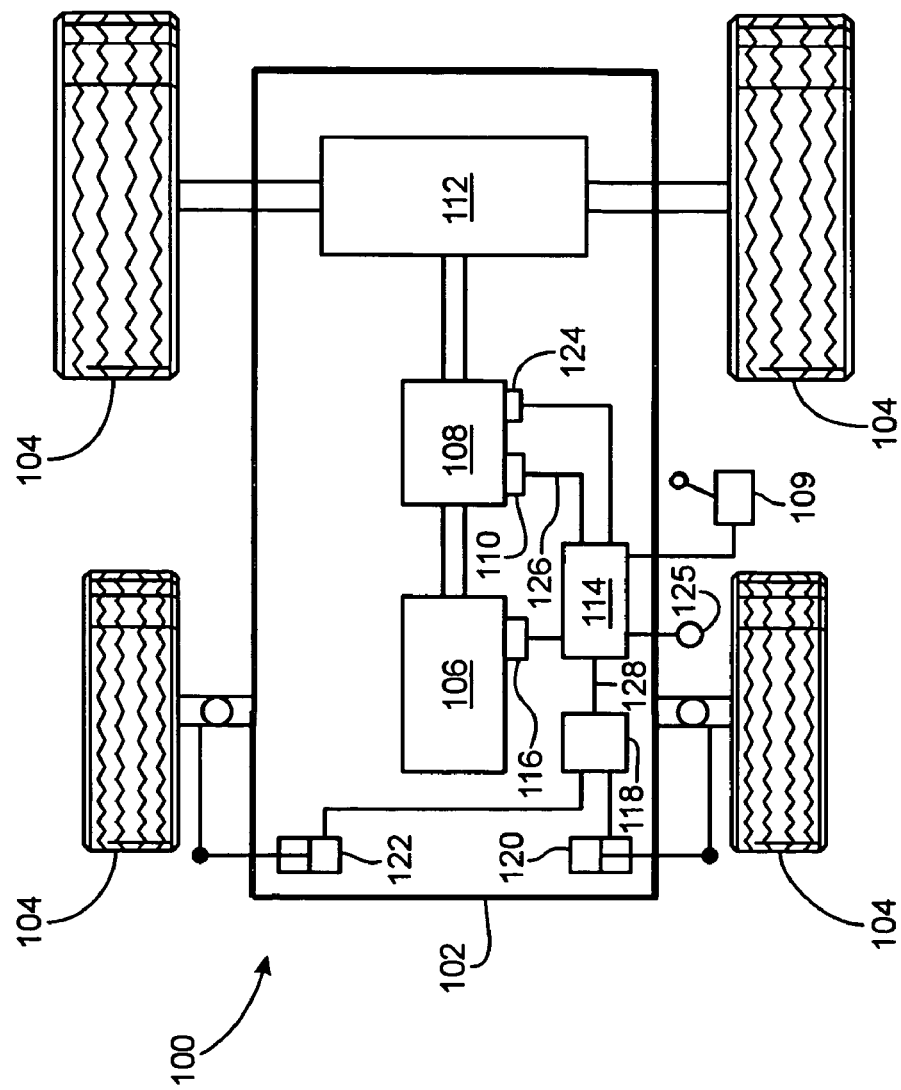
FIG. 2 is a schematic representation of tractor 100 showing the control system and its interconnection to the steering, engine, and transmission complements of the tractor.

FIG. 2 is a schematic representation of work vehicle 100 showing control system 114 and its interconnections to FNR lever 109, transmission valve manifold 110, engine governor 116, steering valve manifold 118 (which in turn is coupled to steering actuators 120, 122), vehicle speed sensor 124, and vehicle position sensor 125.

Control system 114 is an electronic control system that is coupled to transmission valve manifold 110 to drive the transmission valves, to engine governor 116 to monitor the speed of engine 106, and to steering valve manifold 118 to control the steering valves in steering valve manifold 118.

Engine governor 116 provides a signal to control system 114 that indicates the rotational speed of engine 106. In the preferred embodiment, control system 114 uses a speed signal from engine governor 116, which senses the engine speed with its own internal speed sensor. Alternatively, control system 114 may be coupled to a separate speed sensor that indicates the speed of the engine directly. The separate speed sensor indicating engine speed may be coupled directly to the engine or to the transmission, preferably on an input shaft of the transmission. Governor 116 preferably includes an electronic control unit that is coupled to control system 114 by a digital communications circuit, such as a serial communications bus.

The hydraulic valves in transmission valve manifold 110 are preferably actuated by electrical solenoids or coils. The valve coils, in turn, are coupled to and driven by control system 114 over control lines 126. By selectively energizing individual valve coils of the valves in manifold 110, the control system is configured to selectively engage the transmission in any of its forward and reverse gear ratios.

The steering valve manifold 118 includes a plurality of hydraulic steering valves (not shown) that, in turn, are coupled to steering actuators 120, 122. The steering valves are configured to conduct hydraulic fluid to and from the steering actuators 120, 122 when commanded by control system 114. The hydraulic steering valves are preferably actuated by electrical solenoids or coils. The valve coils, in turn, are coupled to and driven by control system 114 over control lines 128. By selectively energizing individual valve coils of the valves in manifold 118, the control system is configured to selectively steer the front wheels 104 of the vehicle to follow a preferred path over the ground.

Steering actuators 120, 122 are coupled to and between chassis 102 and the hubs of front wheels 104. The actuators are preferably hydraulic cylinders that extend and retract when filled with hydraulic fluid. This extension and retraction causes front wheels 104 to pivot with respect to the chassis.

Vehicle speed sensor 124 is disposed to sense the speed of the vehicle. In this embodiment, it is coupled to transmission 108 and senses the rotational speed of the output shaft of the transmission. Since transmission 108 drives differential 112, and since differential 112 has a fixed gear ratio, the output shaft rotational speed is proportional to the speed of the vehicle. In an alternative arrangement, speed sensor 124 can be coupled to the wheels, or to the wheel hub, or to an axle, or to the differential, or to any other component whose speed a movement would indicate the speed of vehicle.

Position sensor 125, is preferably a satellite navigation receiver, and more preferably a GPS receiver. Sensor 125 is coupled to control system 114 and provides the control system with a signal indicative of the position of work vehicle 100.

Figure 3:
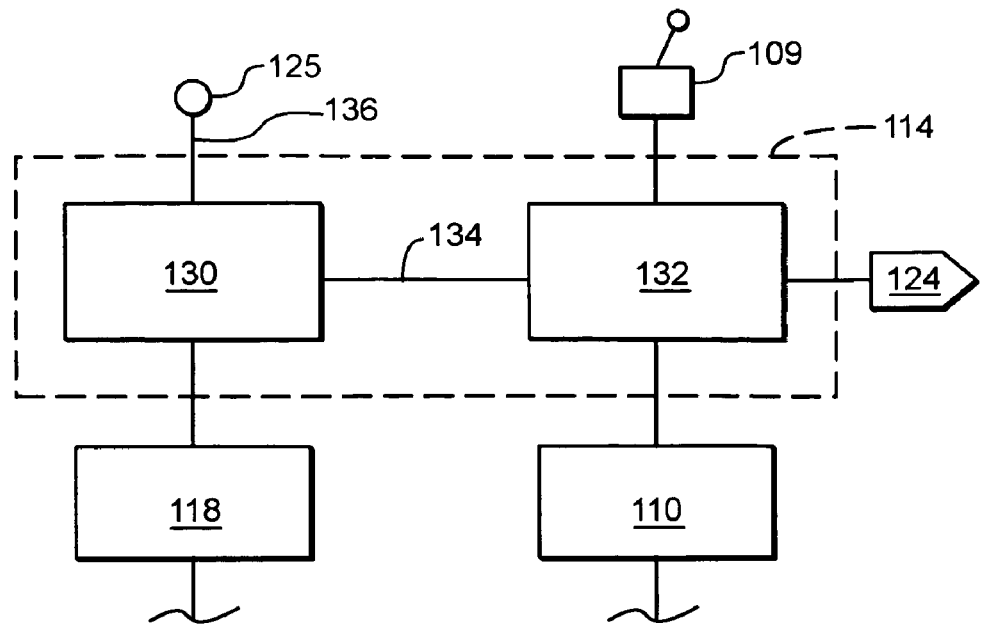
FIG. 3 is a schematic diagram of a control system of the vehicle of FIG. 1. The control system includes a navigation controller configured to steer the vehicle and a transmission controller configured to change the vehicle's gears.

FIG. 3 is a detailed schematic of control system 114. Control system 114 includes a navigation controller 130 and a transmission controller 132 coupled together by communications link 134.

Communications link 134 is preferably a network, more preferably a local-area network, and even more preferably a controller area network or CAN bus. While control system 114 a shown here as formed of two controllers, in an alternative embodiment the functions of control system 114 could be provided by one, three, or more controllers.

Navigation controller 130 is preferably a digital microprocessor based controller or ECU. It is programmed to receive position data from position sensor 125 over signal line 136, to receive direction data indicative of the vehicle's direction of travel from transmission controller 132 over communications circuit 134, to receive speed data indicative of the vehicle speed over link 134 from vehicle speed sensor 124 coupled to controller 132 It is also programmed to mathematically combine the position data, direction data, and speed data to determine the vehicle's position, speed, and direction of travel.

Navigation controller 130 is also programmed to automatically guide the vehicle based upon the determined position, speed, and direction of travel. To do this, controller 130 mathematically compares the vehicle's current position, speed, and direction of travel with a desired path and determines an appropriate steering angle to which the front wheels must be steered in order to return to (or stay on) the desired path. This desired path is stored inside navigation controller 130. It may be periodically calculated, or it may be permanently stored. If stored, it may be expressed as a series of vectors or points. The particular computational algorithm by which navigation controller 130 combines the various signals to determine the vehicle's position direction of travel, and speed, calculates the work vehicle's position, and determines the appropriate steering angle and command signal to apply to the steering valves of steering valve manifold 118 does not form part of this invention and thus are not described in detail herein.

Transmission controller 132 is preferably a digital microprocessor based controller or ECU. It is programmed to receive forward, neutral, and reverse direction commands from FNR lever 109, and to selectively energize corresponding appropriate hydraulic clutch valves in transmission valve manifold 110.

When the operator moves FNR lever 109 to its forward position, transmission controller 132 is programmed or otherwise configured to receive the FNR lever signal indicating the operator's desire to travel forward. In response, controller 132 drives valve manifold 110 to disengage any reverse clutches that may be engaged and to engage forward clutches necessary to engage transmission 108 in a forward gear ratio in which it can drive vehicle 100 in a forward direction.

When the operator moves FNR lever 109 to its reverse position, transmission controller 132 is programmed to receive the FNR lever signal indicating the operator's desire to travel backwards. In response, controller 132 drives valve manifold 110 to disengage any forward clutches that may be engaged and to engage reverse clutches necessary to engage transmission 108 in a reverse gear ratio in which it can drive vehicle 100 backward (i.e. in reverse).

As described above, transmission controller 132 does not immediately disengage the old clutches any engage the new clutches when it receives a signal from FNR lever 109. Instead, transmission controller 132 is configured to "shuttle shift" the transmission over a period of time. This period of time is typically anywhere from zero to four seconds long, depending upon the vehicle load and speed when the operator requests a change in direction. The greater the speed and load, the longer it takes to shuttle shift the transmission.

To shuttle shift the transmission, controller 132 reads speed sensor 124 to determine the speed of the vehicle. If the speed of the vehicle is above a threshold speed, controller 132 is configured to disengage the clutches driving the vehicle and feather the clutches necessary to drive vehicle in the opposite direction. "Feathering" means partially engaging the clutches to transfer some but not all of the engine's power to the drive wheels. If the vehicle is not moving, or is traveling at very low speed, this period of feathering may be quite short, or may be eliminated entirely and the clutches immediately engaged in the new gear ratio to move the vehicle in the new direction. If the transmission is a power shift transmission, transmission controller 132 may automatically downshift the transmission through several gear ratios as it slows the vehicle down to a full stop before reversing direction. It may also automatically upshift the transmission through several gear ratios in the opposite direction of travel until the vehicle is traveling in the new direction at the desired speed up. The specific shuttle shifting algorithms performed by controller 132 form no part of this invention and therefore are not described in detail herein.

Transmission controller 132 performs an additional function: determining the direction of travel of the vehicle. Controller 132 examines the state of transmission 108, and particularly the clutches of transmission 108 to determine whether the transmission is engaged in a forward gear ratio or a reverse gear ratio. Controller 132 also examines the state of vehicle speed sensor 124, which indicates the speed of the vehicle. Based upon the clutch state and the vehicle speed state, controller 132 determines the direction in which the vehicle is traveling and provides this information to navigation controller 130. This process is discussed in greater detail below in conjunction with FIG. 5.

Figure 4:
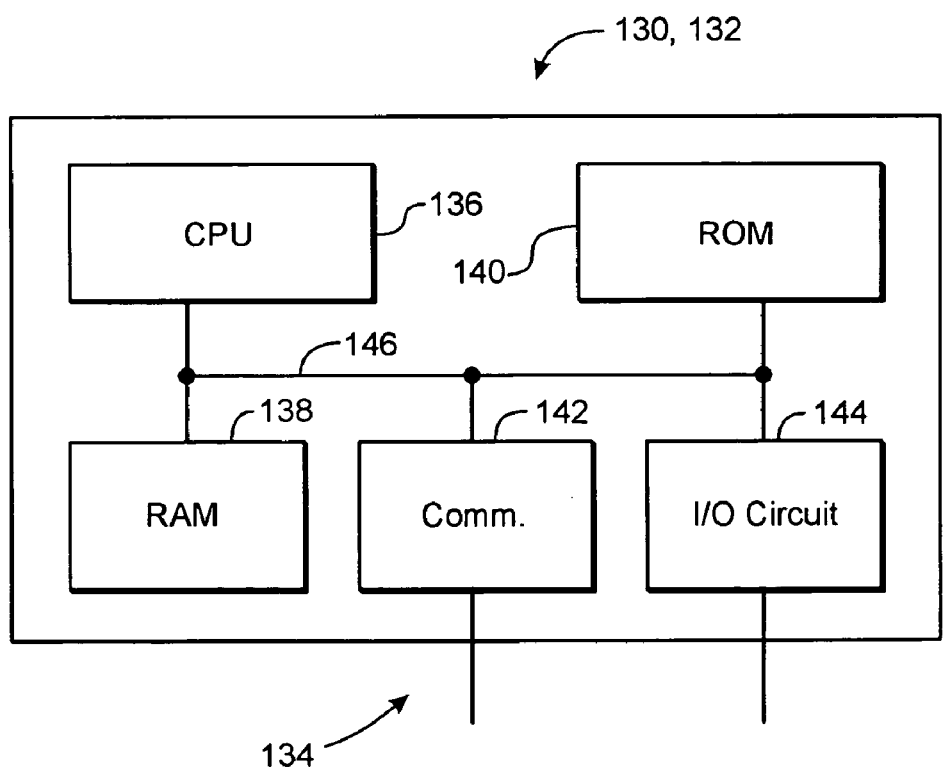
FIG. 4 is a schematic diagram of the navigation controller and a transmission controller of FIG. 2.

FIG. 4 is a schematic representation of navigation controller 130 and transmission controller 132. Each of these controllers includes a central processing unit (CPU) 136, a random-access memory (e.g. a RAM) 138, a nonvolatile memory (e.g. a ROM) 140, a communications circuit (COMM) 142, an input/output and driver circuit (I/O) 144, and a data/address/control bus 146 that couples all of these complements together.

CPU 136 is configured to sequentially request, receive, and execute digital instructions stored in nonvolatile memory 140. These instructions define the entire operation of the controller. Random-access memory 138 includes memory locations that are accessed by CPU 136 during controller operation. These memory locations provide a working memory space for storing computational values calculated by CPU 136 during controller operation. Communications circuit 142 is configured to communicate with other controllers on the network over communications circuit 134. Circuit 134 is preferably a CAN bus. In the configuration shown in FIG. 3, the communications circuit 142 of each controller communicates with the communications circuit 142 of the other controller over the CAN bus.

I/O circuit 144 of transmission controller 132 is coupled to, and configured to sense the signals provided by governor 116, speed sensor 124 and FNR lever 109. It is also coupled to and configured to drive the transmission valves in valve manifold 110 in response to commands issued by CPU 136 over bus 146.

I/O circuit 144 of navigation controller 132 is coupled to, and configured to drive, the steering valves in valve manifold 118 in response to commands issued by CPU 136 over bus 146, and to receive position signals from position sensor 125.

Figure 5:
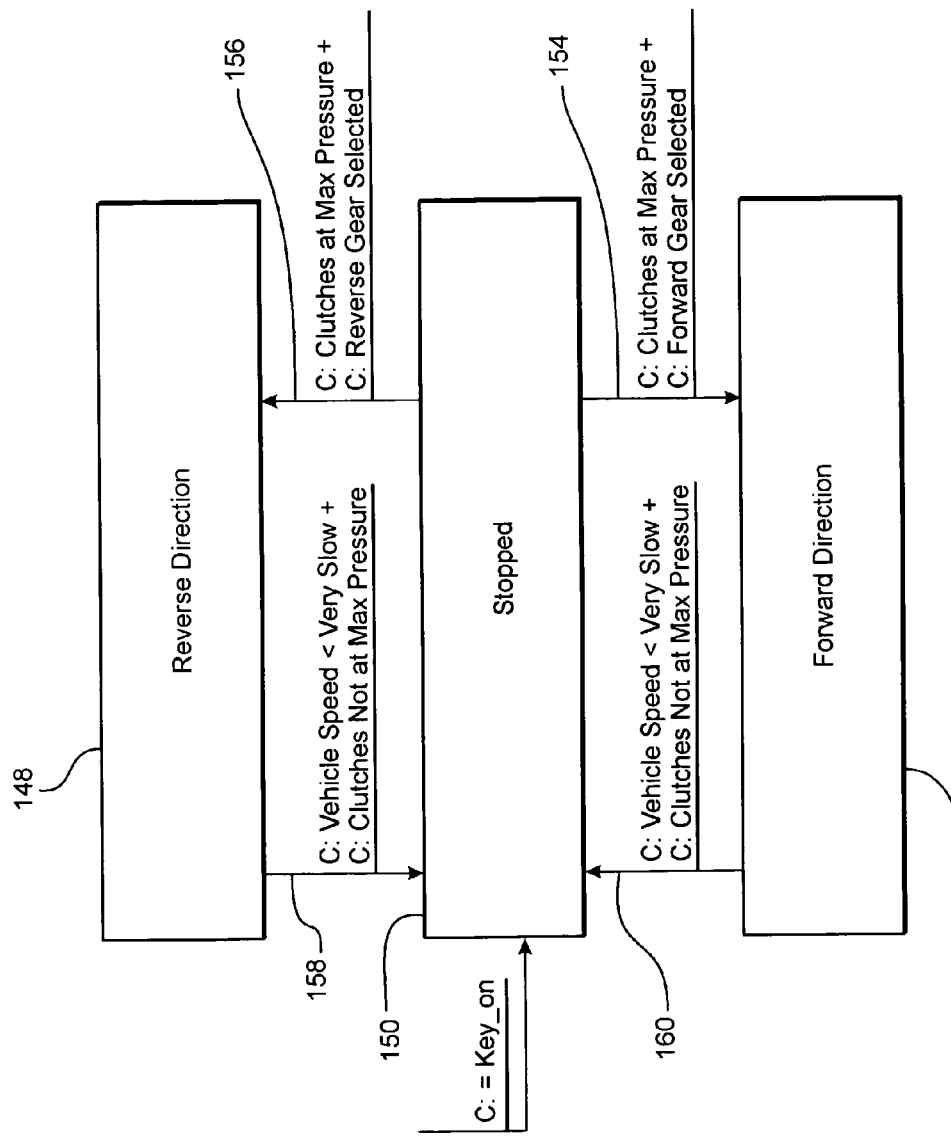
FIG. 5 is a state diagram of the programming executed by the transmission controller when it determines the direction in which the work vehicle is traveling.

FIG. 5 is a state diagram of transmission controller 132. The diagram illustrates the process performed by controller 132 by which it determines the direction of vehicle travel, either Stopped, Forward, or Reverse, and transmits that direction to navigation controller 130.

It should be remembered that the state diagram in FIG. 5 does not illustrate the total operation of controller 132, only the operation of controller 132 when it determines the direction of vehicle travel. Other programs executed by controller 132 respond to operator manipulation of FNR lever 109 by engaging in disengaging clutches thereby changing transmission 108 from one gear ratio to another gear ratio.

When controller 132 executes these other programs it always saves the current target gear ratio—the gear ratio the operator or the controller has currently selected to be engaged—in the controller's memory. Thus, other programs executed by controller 132 can always examine the state of the transmission and know which gear ratio that controller 132 is currently trying to engage. Indeed, retrieving the current gear state, the gear ratio that controller 132 is attempting to engage, is what controller 132 does when it executes the program illustrated in FIG. 5.

It should also be recognized that there are other ways of changing gears than moving the FNR lever 109. Work vehicle 100 includes other gear change mechanisms by which the operator selects specific gear ratios. These mechanisms are not shown herein because they are unnecessary to an explanation of the current invention. They may include such conventional operator inputs for power shift or shuttle shift transmissions such as a speed lever and a gear range lever.

Controller 132 cycles through a control loop every 10 ms checking whether any of the three states indicated in FIG. 5 exist. It does this by determining whether any of the conditions necessary for the states exist. The conditions shown in FIG. 5 are as follows:

Key On:

This is the default condition. It is true whenever the ignition key of the vehicle is initially turned on. When the Key on condition is true, controller 132 immediately transitions from the "Stopped" state. All the clutches are deenergized and the transmission is in Neutral or PARK. No forward gear ratios or reverse gear ratios are selected. The engine is running, but the vehicle does not move.

Clutches at Max Pressure:

This condition is true whenever controller 132 checks the pressures in each of the clutches that have been selected for engagement (i.e. the clutches of the target gear ratio) and determines that they are at their full pressure. Full pressure indicates that the clutches are 100% engaged. Thus, whenever the condition "Clutches at Max Pressure" exists, the transmission is engaged in the target gear ratio. It should be remembered that the programming illustrated in FIG. 5 does not set the target gear ratio. In the preferred embodiment, the clutch pressure is determined indirectly, although direct sensing of the clutch pressure may be used. Many transmission clutches are proportional. The pressure in the clutch and the degree of engagement is proportional to the signal that is applied to and drives the valve. By examining the signal applied to the valve, one can indirectly determine the clutch pressure without directly measuring it. Since the signal is proportional to the pressure, knowing the signal means knowing the pressure. Controller 132 can determine whether the clutches are a maximum pressure by examining the current clutch setting—the signal that controller 132 applies to the clutch.

Clutches Not at Max Pressure:

This condition is true whenever controller 132 checks the pressures in each of the clutches that have been selected for engagement (i.e. the clutches of the target gear ratio) and determines that at least one of them is not at its full pressure. As long as one clutch of a set of clutches necessary to engage the transmission in either a forward or reverse gear ratio is not at its full pressure, the transmission is not 100% engaged. The clutch can slip, as it does when the clutches are "feathered" during shuttle shifting. Again, controller 132 can check the clutch pressure directly or indirectly.

Vehicle Speed<Very Slow:

This condition exists whenever controller 132 checks the speed sensor 124 and determines that the vehicle is traveling at less than a certain, low predetermined speed. The speed varies depending upon the vehicle, but it is preferably selected to be less than 1 mph. When speed sensor 124 indicates the speed is less than the predetermined speed, "Vehicle Speed<Very Slow" is true.

Reverse Gear Selected:

Controller 132 checks the target gear ratio to see whether other programs executed by controller 132 are attempting to engage transmission 108 in any reverse gear ratio. If they are, the condition "Reverse Gear Selected" will be true.

Forward Gear Selected:

Controller 132 checks the target gear ratio to see whether other programs executed by controller 132 are attempting to engage transmission 108 in any forward gear ratio. If they are, the condition "Forward Gear Selected" is true.

State Transitions:

Controller 132 examines the state of the transmission each time it performs its 10 ms loop executing the program illustrated in FIG. 5. Controller 132 identifies when another program executed by controller 132 has selected a target gear ratio and has engaged the transmission in that gear ratio.

Whenever controller 132 determines that the vehicle has entered one of the three states ("Reverse Direction" 148, "Forward Direction" 150, or "Stopped" 152) controller 132 transmits this state information to navigation controller 130 over communications link 134. Controller 132 also transmits the vehicle speed to controller 130, which it determines from sensor signal 124 Navigation controller 130, in turn, combines the direction information and the speed information with the GPS position information and determines the position, orientation, and movement of vehicle 100 in the field.

In the paragraphs below we explain how controller 132 determines that the vehicle has transitioned from one state to another.

When the vehicle is initially started up, condition "Key_on" is true and controller 132 immediately transitions to the "Stopped" state. At least initially, the clutches are disengaged, the transmission is in Neutral or PARK and the vehicle is stopped. Controller 132 transmits a packet of data indicating the "Stopped" state to navigation controller 130 over communications link 134. This informs navigation controller 130 that the vehicle is stopped and is not moving.

Once engine 106 has started, however, the operator can at any time manipulate FNR lever 109 or other gear select levers (not shown) to place transmission 108 in a forward or reverse gear ratio. Other programs executed by controller 132 monitor FNR lever 109 and the other gear select levers. These other programs control transmission 108 to shift it from one gear ratio to another. This shifting includes the "shuttle shifting" described above.

To determine the state of the vehicle, controller 132 periodically examines the transmission conditions listed above. In the "Stopped" state, controller 132 checks the "Clutches at Max Pressure", "Forward Gear Selected", and "Reverse Gear Selected" conditions. If both the "Clutches at Max Pressure", and "Forward Gear Selected" conditions are true (see flow path 154), controller 132 transmits the "Forward Direction" state to navigation controller 130. This indicates to navigation controller 130 that the vehicle is traveling forward.

On the other hand, if both the "Clutches at Max Pressure", and "Reverse Gear Selected" conditions are true (see flow path 156), controller 132 transmits the "Reverse Direction" state to navigation controller 130. This indicates to navigation controller 130 that the vehicle is traveling backward (i.e. in reverse).

If none of these conditions exist in the "Stopped" state, controller 132 continues monitoring the conditions but does not transmit anything to navigation controller 130.

Let us assume that controller 132 has previously entered (i.e. recognized) the "Reverse Direction" state 148 from the "Stopped" state 150. In the "Reverse Direction" state 148, controller 132 checks two conditions: the "Vehicle Speed<Very Slow" condition and the "Clutches not at Max Pressure" condition. When controller 132 determines that these two conditions are true (see that flow path 158), controller 132 transitions to the "Stopped" state 150 and transmits the "Stopped" state direction to navigation controller 130. This indicates to navigation controller 130 that the vehicle is either stopped or very close to stopped. If none of these conditions exist while controller 132 is in the "Reverse Direction" state, it continues monitoring the conditions but does not transmit anything to navigation controller 130.

Let us assume that controller 132 has previously entered (i.e. recognized) the "Forward Direction" state 152 from the "Stopped" state 150. In the "Forward Direction" state 152, controller 132 checks two conditions: the "Vehicle Speed<Very Slow" condition and the "Clutches not at Max Pressure" condition. When controller 132 determines that these two conditions are true (see flow path 160), controller 132 transmits the "Stopped" state 150 to navigation controller 130. This indicates to navigation controller 130 that the vehicle is either stopped or very close to stopped. If none of these conditions exist while controller 132 is in the "Forward Direction" state 152, it continues monitoring the conditions but does not transmit anything to navigation controller 130.

A Typical Forward-to-Reverse Shuttle Shift:

Assume work vehicle 100 is traveling forward at a speed of 15 miles an hour. At some time previous, controller 132 would have transmitted the "Forward Direction" state signal to navigation controller 130.

Controller 132 is configured to read vehicle speed sensor 124 and transmit the vehicle speed to controller 130 over communications link 134 every 10 ms.

At some point the operator moves the FNR lever from its F position to its R position thereby requesting travel in the reverse direction. When transmission controller 132 receives this signal, it begins executing its gear shifting program. Controller 132 disengages the clutches that were engaged to drive the work vehicle 100 forward and begins feathering the reverse clutches to slow the vehicle down. As the reverse clutches are engaged, work vehicle 100 begins to slow down. It is still moving forward, however, and controller 132 has not yet changed from the "Forward Direction" state 152 to the "Stopped" state 150.

With the prior art systems, transmission controller 132 would by this time have informed navigation controller 130 that the vehicle was traveling in reverse based upon the "reverse" position of FNR lever 109 even though work vehicle 100 would still have been traveling forward at a substantial speed.

With the new system described herein work vehicle 100 is still traveling forward at a speed close to 15 miles an hour, however, yet transmission controller 132 has not yet indicated any change in direction of travel and moved to the "Reverse Direction" state 148.

With the forward clutches disengaged and the reverse clutches feathered, work vehicle 100 begins slowing down. The shifting program of transmission controller 132 is configured to select an optimum rate of deceleration for the vehicle. This process of gradual slowing may take as long as four seconds. Eventually, however, the vehicle speed indicated by speed sensor 124 will drop close to zero and controller 132 will determine that condition "Vehicle Speed<Very Slow" is true. Since neither the forward clutches nor reverse clutches are fully engaged (i.e. fully pressurized) the condition "Clutches Not At Max Pressure" is also true.

Thus, as the tractor approaches the "Very Slow" speed threshold, near a complete stop, controller 132 determines that the "Stopped" state 150 exists.

Controller 132 transmits the "Stopped" state message to navigation controller 130 over communications link 134.

The shuttle shifting program executed by controller 132 also senses that the vehicle is nearly stopped. When it does, it engages the reverse clutches 100%, fully energizing the clutch valve coils of the reverse clutches. When this happens, controller 132 senses that the condition "Clutches At Max Pressure" is true. It also senses that the condition "Reverse Gear Selected" is true. Since both conditions are true, controller 132 determines that the "Reverse Direction" state 148 exists and transmits the "Reverse Direction" message to controller 130 over communications link 134. With the reverse clutches fully engaged, the tractor immediately begins moving in reverse.

This example describe a shuttle shift from forward to reverse. From the description above of the states and conditions shown in FIG. 5, it should be clear that the same process occurs when making a reverse to forward shuttle shift. It should also be clear that whenever the operator de-clutches the work vehicle 100, such as when coming to a stop at an intersection, transmission controller 132 will sense the reduction in clutch pressure and the slow speed, recognize the transition to the "Stopped" state 150, and transmit the "Stopped" state 150 message to navigation controller 130. Even if the FNR lever 109 remains in "forward" or "reverse", navigation controller 130 will be informed that the vehicle is "Stopped".

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. For example, in the discussion above controller 132 is described as performing the functions identified above every 10 ms in a control loop. While this is the preferred embodiment, controller 132 can execute its control loop at longer or shorter intervals. Accordingly, the following claims are intended to protect the invention broadly as well as in the specific form shown.

The invention claimed is:

1. A work vehicle, comprising:
a chassis;
an engine mounted on the chassis;
a transmission driven by the engine, the transmission including at least one clutch configured to engage the transmission in a forward gear ratio and at least another clutch configured to engage the transmission in a reverse gear ratio;
a plurality of wheels supporting the chassis for movement over the ground,
at least one of said wheels being coupled to the transmission to be driven thereby;
at least one steering actuator coupled to the chassis to steer the chassis with respect to the ground;
a navigation controller coupled to the at least one steering actuator to control the steering actuator; and
a transmission controller coupled to the transmission and to the navigation controller to sense a transmission parameter and communicate a vehicle direction to the navigation controller based upon the transmission parameter 2. The work vehicle of claim 1, wherein the transmission parameter is a hydraulic fluid pressure of at least one clutch in the transmission parameter.

3. The work vehicle of claim 1, wherein the transmission comprises an output shaft, and further wherein the transmission parameter is a speed of the output shaft.

4. The work vehicle of claim 1 wherein the navigation controller is configured to calculate a steering command based on the vehicle direction received from the transmission controller.

5. The work vehicle of claim 1, further comprising GPS postion receiver coupled to the navigation controller and configured to provide the navigation controller with a position of the work vehicle.

6. The work vehicle of claim 1 wherein the transmission controller is configured to periodically determine whether a forward gear ratio is selected, and to transmit data indicative of vehicle movement in a forward direction based at least upon the forward gear ratio being selected.

7. The work vehicle of claim 1, wherein the navigation controller and the transmission controller are both microprocessor-based ECUs, wherein the navigation controller and the transmission controller coupled together over a serial communication bus, and further wherein the transmission controller is configured to transmit the vehicle direction to the navigation controller over of the serial communication bus.

8. A method of determining a direction of travel of a work vehicle comprising a transmission, said transmission comprising a plurality of clutches and communicating that direction to a vehicle navigation system, the method comprising the steps of:
   determining at least one operating state of the transmission;
   determining a first direction of vehicle travel based upon the at least one operating state; and
   communicating the first direction of vehicle travel to the vehicle navigation system 9. The method of claim 8, wherein the step of determining at least one operating state includes the step of determining a pressure of a transmission clutch and comparing that pressure to a predetermined clutch pressure.

10. The method of claim 9, wherein the step of dtermining at least one operating state includes the step of determining the pressures of a set of clutches sufficient to engage the vehicle in a forward gear ratio and comparing the pressures to a predetermined clutch pressure.

11. The method of claim 9, wherein the step of determining at least one operating state includes the step of determining the pressures of a set of clutches sufficient to engage the vehicle in a reverse gear ratio and comparing the pressures to a predetermined clutch pressure.

12. The method of claim 8, further including the steps of:
   determining a second direction of vehicle travel based upon at least a second operating state; and
   communicating the second direction of vehicle travel to the vehicle navigation system.

13. The method of claim 12, wherein the at least one operating state is the full engagement of clutches sufficient to drive the vehicle in a forward direct.

14. The method of claim 13, wherein the at least a second operating state is the engagement of clutches sufficient to drive the vehicle in a reverse direction.

15. A control system for a work vehicle including a transmission, the transmission including a plurality of clutches for driving the vehicle over the ground. the vehicle also including a navigation system and steering actuators coupled to the navigation system, the steering actuators being configured to steer the vehicle, the control system comprising:
   means for determining a direction of travel of the vehicle by sensing current operating state of the transmission; and
   means for communicating the direction of travel to the navigation system.

16. The control system of claim 15, wherein the means for determining a direction of travel includes means for determining an engagement state of the plurality of clutches.

17. The control system of claim 15, wherein the means for determining a direction of travel includes means for determining a pressure state of the plurality of clutches.

18. The control system of claim 15, wherein the means for communicating includes a means for serially communicating coupling the means for determining a direction of travel to the navigation system.

19. The control system of claim 15, wherein the means for determining a direction of travel includes means for determining whether a plurality of clutches sufficient to engage the vehicle in a forward gear ratio are engaged.

20. The control system of claim 19, wherein the means for determining a direction of travel includes means for determining whether a second plurality of clutches sufficient to engage the vehicle in a reverse gear ratio are engaged.

* * * * *